United States Patent [19]
Cummins et al.

[11] Patent Number: 5,997,923
[45] Date of Patent: Dec. 7, 1999

[54] METHOD FOR FLOURING SEQUENTIAL PIECES OF BAKERY DOUGH

[76] Inventors: Chris M. Cummins, 11184 Hopson Rd., Ashland, Va. 23005; Sam Seiling, 2307 Viking La., Richmond, Va. 23228

[21] Appl. No.: 09/161,583

[22] Filed: Sep. 28, 1998

[51] Int. Cl.⁶ ........................................... A21C 9/08
[52] U.S. Cl. .................. 426/289; 426/549; 426/496; 425/96; 425/101; 425/104; 425/364 R; 425/403; 425/337; 118/16; 118/24
[58] Field of Search ........................... 426/289, 496, 426/549; 425/364 R, 403, 96, 101, 104, 337, 217; 118/16, 24

[56] References Cited

U.S. PATENT DOCUMENTS

| | | | |
|---|---|---|---|
| 2,746,401 | 5/1956 | Archer | 425/364 R |
| 2,963,994 | 12/1960 | Britcher | 107/9 |
| 3,012,697 | 12/1961 | Rouse, Jr. et al. | 222/181 |
| 3,115,103 | 12/1963 | Huss | 425/337 X |
| 3,325,573 | 6/1967 | Boon et al. | 264/54 |
| 3,659,981 | 5/1972 | Ferstenberg | 425/89 |
| 4,123,213 | 10/1978 | Laramore | 425/104 |
| 4,636,301 | 1/1987 | Laramore | 209/31 |
| 5,540,140 | 7/1996 | Rubio et al. | 99/353 |
| 5,540,578 | 7/1996 | Atwood | 425/364 |
| 5,553,522 | 9/1996 | Loechtenfeldt et al. | 99/494 |

*Primary Examiner*—Milton Cano
*Attorney, Agent, or Firm*—Norman B. Rainer

[57] ABSTRACT

Sequential pieces of bakery dough are floured using a moving belt positioned beneath an elongated flour dispensing mechanism. The belt runs through a stationary guide that transiently forms the belt into a tubular enclosure which embraces the dough pieces, thereby producing a more complete flour coating on the pieces.

2 Claims, 2 Drawing Sheets

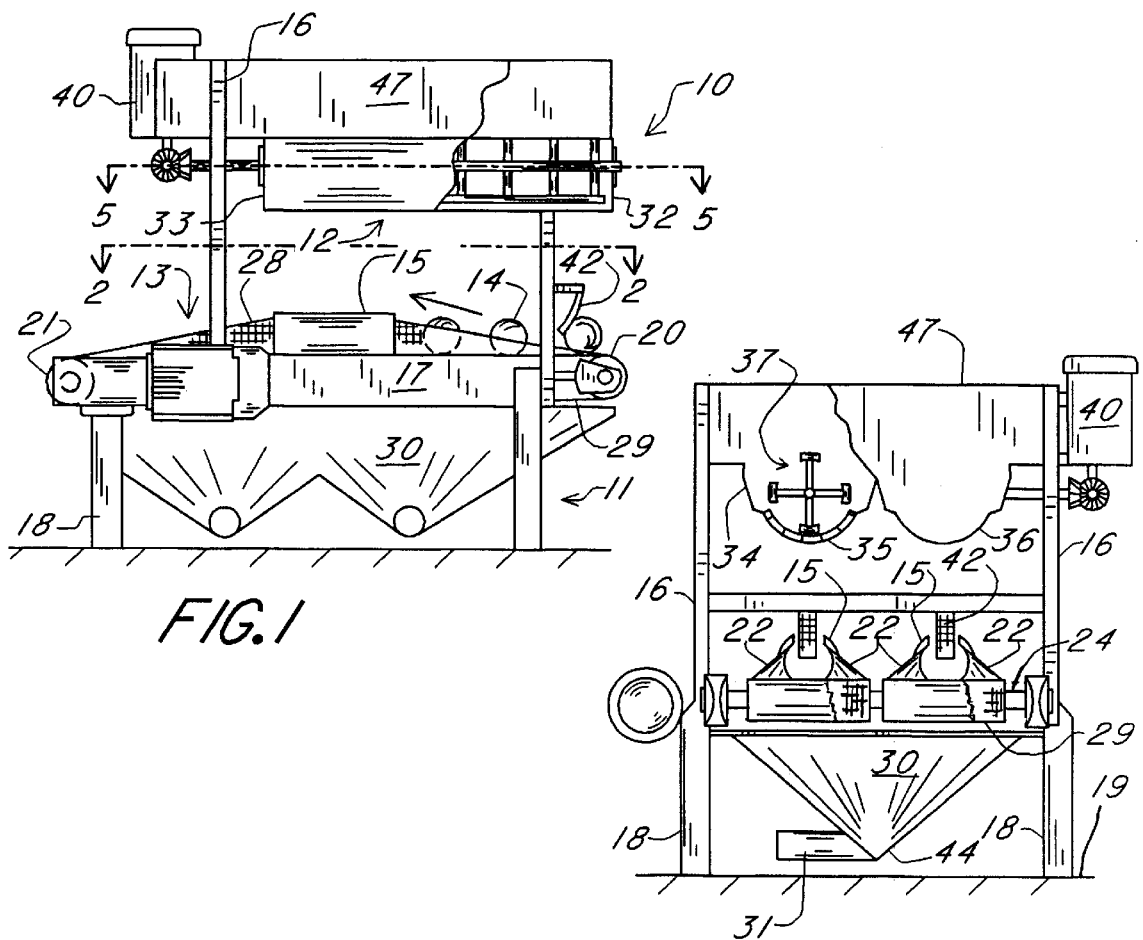
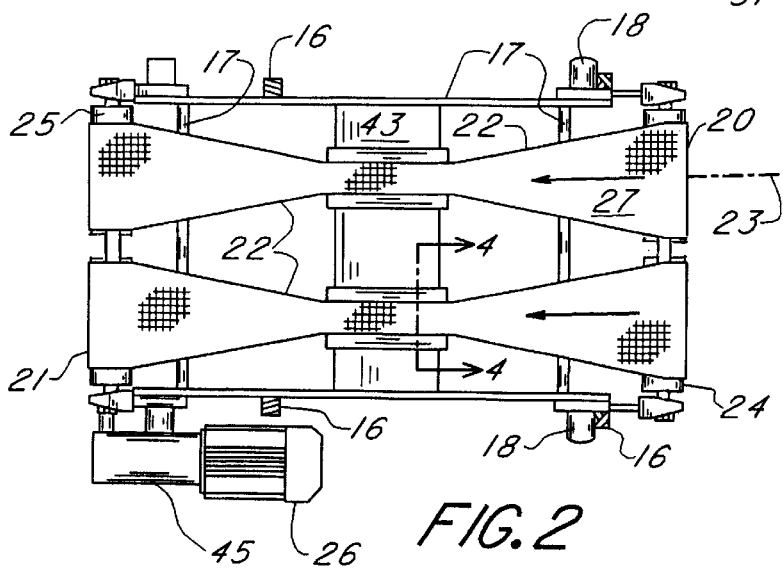
FIG.1
FIG.3
FIG.2

METHOD FOR FLOURING SEQUENTIAL PIECES OF BAKERY DOUGH

BACKGROUND OF THE INVENTION

1. Field of the Invention

This invention relates to the processing of bakery dough, and more particularly concerns apparatus for applying flour to sequential pieces of dough for the purpose of preventing adhesion of said dough pieces to dough-handling equipment.

2. Description of the Prior Art

It has been long known that flour can be employed to prevent pieces of bakery dough from sticking to the surfaces of bakery-handling equipment. In simplest form, a layer of flour is deposited upon a horizontal surface such as a moving belt or stationary tray onto which pieces of dough are deposited. However, the upper surface of the piece of dough is still sufficiently tacky so that it will adhere to the surfaces of other equipment which receive the dough.

"Flouring" devices for applying flour to dough pieces or equipment surfaces generally include a flour hopper and means for dispersing and distributing the flour. The distributing means generally include agitators, screens and vibrators, as disclosed in U.S. Pat. No. 3,012,697. Such manner of dispensing the flour generally produces an undesirable airborne dust which constitutes a health hazard for workers who breathe the air adjacent the dough-handling machinery. Once settled, the flour accumulates throughout the bakery as wastage, causing significant housekeeping problems and potential insect infestation.

U.S. Pat. No. 2,963,994 to Britcher discloses apparatus for applying a flour dust cloud to dough pieces rolling down a stationary rounder device that shapes the dough piece. Although the Britcher apparatus is intended to coat the entire surface of the dough piece and coat associated machinery surfaces, it attempts to accomplish this on pieces of dough that are moving upon stationary supporting or shaping surfaces. It has been found however, that moving pieces of bakery dough are apt to deform and thereby produce fresh tacky surfaces.

U.S. Pat. No. 4,123,213 to Laramore, like Britcher, discloses apparatus for flouring balls of dough as they roll down an inclined stationary chute. U.S. Pat. No. 4,636,301 to Laramore discloses apparatus for flouring balls of dough held within cups on a conveyor. Although this apparatus minimizes the amount of flour lost or wasted, complete flouring of the entire dough ball surface is not readily achieved.

U.S. Pat. No. 5,553,533 discloses a flouring device for dispensing flour downwardly onto dough on a moving belt. It should be noted however, that the dough, whether in the form of continuous extrudate, pieces or shaped balls, will have a generally upwardly convex upper surface that merges into an underside which is generally downwardly convex. When flour is dropped from above onto the upper surface, a shadowing effect is produced whereby the convex underside receives no flour, and thereby remains tacky.

The use of moving belts for transporting dough is well known, as indicated in the aforesaid reference patents. Moving belts have additionally been employed in other industries for the shaping or transport of products, as disclosed in U.S. Pat. Nos. 3,325,573 and 3,659,981. However, endless compliant conveyor belts have not heretofore been employed interactively with pieces of dough other than to serve as a flat transporting surface.

It is accordingly an object of the present invention to provide flouring apparatus for the treatment of sequential pieces of bakery dough.

It is another object of this invention to provide flouring apparatus which will deposit a flour coating upon the entire surface of said pieces of dough.

It is a further object of the present invention to provide flouring apparatus of the aforesaid nature which employs a compliant moving belt to transport said dough pieces.

It is yet another object of the present invention to provide flouring apparatus of the aforesaid nature wherein the sequential pieces of dough remain motionless with respect to belt movement during at least the final stage of the flouring treatment.

It is a still further object of this invention to provide flouring apparatus of the aforesaid nature which minimizes flour losses.

An additional object of the present invention is to provide flouring apparatus of the aforesaid nature of simple, durable construction amenable to low cost manufacture and easy maintenance.

These objects and other objects and advantages of the invention will be apparent from the following description.

SUMMARY OF THE INVENTION

The above and other beneficial objects and advantages are accomplished in accordance with the present invention by apparatus for flouring sequential pieces of bakery dough being transported upon a substantially horizontally disposed compliant belt traveling in a substantially straight path between entrance and exit extremities, said apparatus comprising:

a) a structural framework, b) flour dispensing means centered above said belt by said framework and elongated upon an axis coextensive with the path of travel of said belt, said dispensing means extending from a first end positioned generally above said entrance extremity and a second end directed toward said exit extremity, and c) a shaping guide secured to said framework and positioned to slidingly receive said belt in a manner to transiently shape said belt into a substantially tubular enclosure which embraces said pieces of dough, said guide being located below said dispensing means and elongated upon an axis that is substantially vertically coplanar with the axis of said dispensing means.

In a preferred embodiment of the invention, impeding means may be positioned above said belt adjacent said entrance extremity for the purpose of contacting the upper portion of each piece of dough being transported upon the belt, thereby causing rotation of said dough piece in the direction of belt travel. Such rotation causes the contacted piece of dough to pick up flour in a vertically oriented circumferential band.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the flouring apparatus of the present invention, with portions broken away to show interior details.

FIG. 2 is a sectional view taken in the direction of the arrows upon the line 2—2 of FIG. 1.

FIG. 3 is an end view taken from the right of FIG. 1, with portions broken away to reveal interior details.

DESCRIPTION OF THE PREFERRED EMBODIMENT

Figure 4:
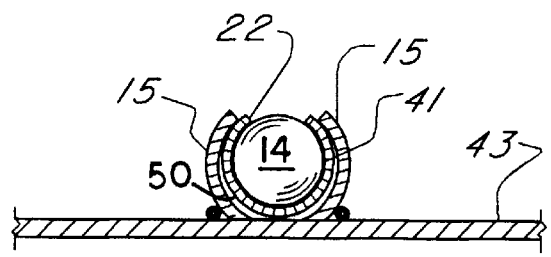
FIG. 4 is an enlarged fragmentary sectional view taken in the direction of the arrows upon the line 4—4 of FIG. 2.
Figure 5:
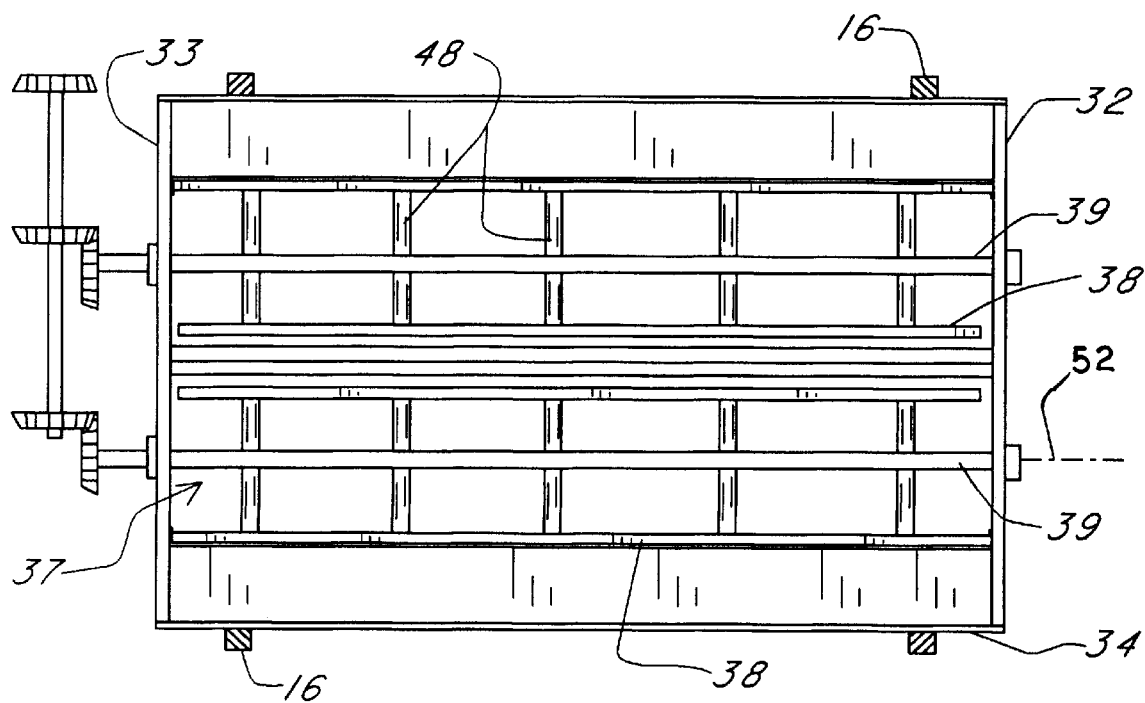
FIG. 5 is an enlarged sectional view taken in the direction of the arrows upon the line 5—5 of FIG. 1.

Referring now to FIGS. 1–5, an embodiment of the flouring apparatus 10 of the present invention is shown comprised of structural framework 11 supporting flour dispensing means 12 above compliant moving belt 13 upon which dough pieces 14 are transported, and shaping guide 15 through which belt 13 passes.

Structural framework 10, of conventional metal beam construction, is comprised of upright members 16, lateral members 17 and leg portions 18 capable of anchoring to the floor 19.

Belt 13 extends in substantially horizontal orientation and in a preferably straight path between entrance and exit extremities 20 and 21, respectively. The belt is bounded by parallel border edges 22 which define therebetween a center axis 23. The belt is held taut and flat by upstream and downstream rollers 24 and 25, respectively, associated with said entrance land exit extremities, respectively. Said downstream roller further serves to drive said belt, the driving force being provided by first motor 26 and associated speed control means 45 supported by said framework. Belt 13, having interior and exterior surfaces 27 and 50, respectively, is of endless loop construction and is compliant in both axial and transverse directions while being non-extensible. Exterior surface 27 preferably has little adhesive affinity for dough, yet preferably retains flour for transfer to the dough pieces, said attributes of the belt being achieved, for example, by a woven cotton construction. The belt is deployed in a manner forming an upper, working zone 28 and a lower, return zone 29. Cleaning means may be employed to act upon both interior and exterior surfaces, preferably within said return zone 29.

At least one recovery chamber 30 having a downwardly directed apex 44 is disposed below return zone 29 for the purpose of receiving excess flour falling from the belt. A vacuum exhaust line 31 associated with apex 44 sucks air through chamber 30. The airstream thereby produced exerts a directional effect which constrains any airborne flour above the belt to travel through chamber 30.

Flour dispensing means 12 is elongated upon an axis 21 co-extensive with belt axis 23 and preferably vertically coplanar therewith, and extends between a first end 32 positioned above entrance extremity 20 of the belt, and a second end 33 directed toward exit extremity 21 of the belt. Said flour dispensing means is comprised of an outer housing 34 of uniform cross-sectional contour along axis 21 and having a screened portion 35 of circularly arcuate contour along the lowermost portion 36 of said housing. An agitator 37 comprised of a center axle 39 and at least one beater bar 38 secured thereto by radial vanes 48 is rotatively positioned within housing 34 by virtue of journalled engagement of the axle with said opposed first and second ends 32 and 33, respectively. Said beater bars 38 may be straight or spiralled and are uniformly spaced radially from said axle and positioned so as to closely approach said screened portion. A hopper 47 receives flour for gravity flow into housing 34. Axle 39 is rotatively driven by second motor 40. The rate of rotation of axle 39 may be interactively coupled to the rate of travel of belt 13. In operation, flour entered into the open upper portion of housing 34 is dispersed by bars 38 and caused to filter through screened portion 35, thence falling downwardly onto the underlying belt 13.

Shaping guide 15 is affixed to transverse horizontal panel 43 of framework 11 and is positioned to slidingly receive belt 13 to shape it into a transient tubular enclosure 41 that embraces said pieces of dough. Guide 15 is located below said flour dispensing means, and is elongated upon a center axis that is vertically coplanar with center axis 23 of the belt and axis 21 of said flouring means.

In the illustrated specific embodiment, two units of the flouring apparatus of the present invention are disposed in lateral side-by-side relationship where both belts are driven by a single first motor and both flour dispensing means are serviced by a single second motor. Similarly, other embodiments of the invention may include three or more units of the flouring apparatus in side-by-side relationship. The transmission of rotative motion from said motors to said belts and dispensing means may be accomplished by conventional power transmission belts or roller chains, or by geared shafts. The direction of motion of belt 13 is such that working zone 28 travels from entrance extremity 20 to exit extremity 21, as shown by the arrowed lines in FIGS. 1 and 2.

Impeding means in the form of chain mail panel 42 may be pendently supported by framework 11 at a location above belt 13 adjacent entrance extremity 20. The function of said impeding means, as best shown in FIGS. 1 and 3, is to cause the dough pieces, preferably in ball shape, to rotate in a vertical plane by virtue of belt movement. Such rotation of the ball of dough causes it to pick up a flour coating from the flour on the belt. The impeding means can be any relatively heavy member which provides some restraint to the forward travel of the dough ball. A chain mail type of impeding member is preferable because its considerable weight can be applied over a wide zone yet it is sufficiently compliant to enable the dough piece to pass without deformation. Because of the porous nature of a woven chain mail, flour received from dispensing means 12 will pass through the mail to minimize adhesion to the dough pieces.

In the operation of the flouring apparatus of this invention, pieces of dough, preferably in ball form, are deposited sequentially upon the upper zone of belt 13 adjacent entrance extremity 20. The belt, having a layer of flour by virtue of the action of overhead dispensing means 12, carries the dough piece forwardly while additional flour falls upon the top portion of the dough piece. When the dough piece is carried through the transient tunnel region created by guide 15, flour retained upon exterior surface 27 is applied to the piece, achieving the coating of those portions of the surface of the piece that earlier remained uncoated by virtue of shadowing effects or other factors. It is important to note that such result is achieved because the exterior surface of the belt has a texture which holds a layer of flour relative to lateral movement upon the belt. If, for example, the belt were of stainless steel or smooth plastic construction, permitting lateral sliding movement of flour on the belt surface, the flour would not be carried upwardly for application to the dough in the tunnel region.

The completely floured piece of dough is then transported without movement relative to the belt to the next processing station in the bakery. By virtue of the specialized aspects of this invention, the dough pieces are thoroughly floured, and remain that way, and the undesired release of flour is minimized.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described our invention, what is claimed is:

1. A method for flouring bakery dough comprising:

a) depositing pieces of dough in a sequential linear array on a moving belt, b) depositing flour onto said belt and pieces by gravity fall, and c) passing said belt through a stationary guide that transiently forms a tubular enclosure that embraces said pieces and causes flour to be transferred from said belt to said pieces.

2. The method of claim 1 wherein said pieces of dough remain stationary with respect to said belt.

* * * * *